J. M. Case,
Universal Joint.
N° 82,084.  Patented Sep. 15, 1868.

Witnesses:
Wm. A. Morgan
G. C. Cotton

Inventor:
J. M. Case
per Munn & Co
Attorneys

United States Patent Office.

JOHN M. CASE, OF WORTHINGTON, OHIO.

Letters Patent No. 82,084, dated September 15, 1868.

IMPROVEMENT IN ANGULAR SHAFT-COUPLING.

The Schedule referred to in these Letters Patent and making part of the same.

TO ALL WHOM IT MAY CONCERN:

Be it known that I, JOHN M. CASE, of Worthington, in the county of Franklin, and State of Ohio, have invented a new and useful Improvement in Angular Shaft-Coupling; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to improve the construction of my angular shaft-coupling, patented March 10, 1868, and numbered 75,364, so as to make it simpler and cheaper in construction, and equally efficacious in use; and it consists in the construction and combination of various parts, as hereinafter more fully described.

Figure 1:
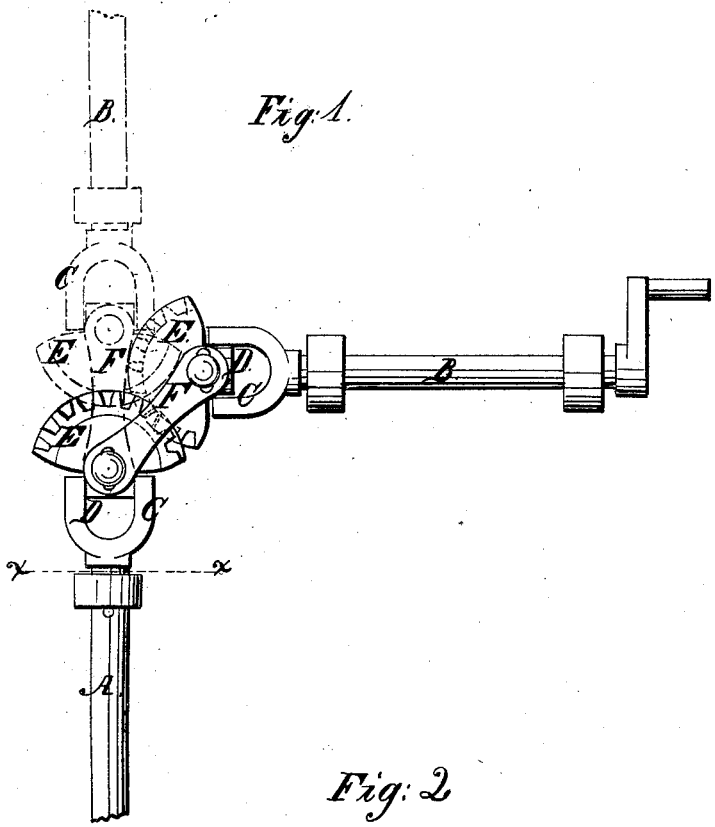
Figure 1 is a top view of the adjacent ends of two shafts connected by my improved coupling.
Figure 2:
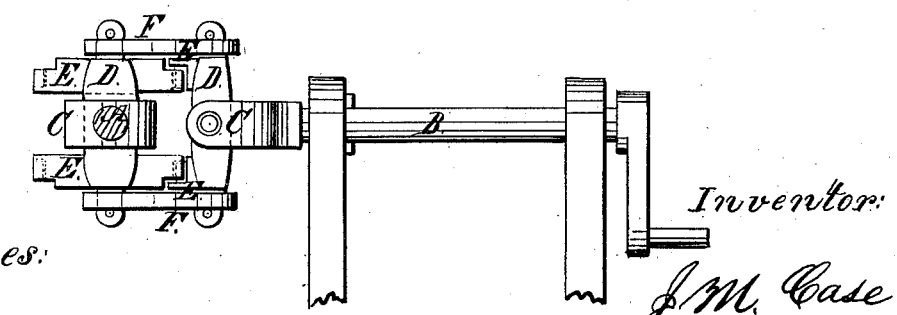
Figure 2 is a side view of the same, partly in section, through the line $x\,x$, fig. 1.

A and B represent two shafts, which may meet each other at any desired angle. To the adjacent ends of the shafts A and B are keyed, or otherwise securely attached, clevises or forks, C, between the ends of the forks or arms of which are pivoted the connection-bars, D, by a pin or bolt passing through the said ends of the said arms, and through the centre of the said bars D. The connecting-bars D are made solid, and upon their ends are cast segmental cogs, E, the teeth of which mesh into each other, as shown in figs. 1 and 2. The segmental cogs E are formed with a flange or rim upon the outer sides of the one set, and a flange or rim upon the inner side of the other set, which said flanges cause the said segmental cogs to always work in line, and they also receive the side pressure, thus relieving the connecting-bars, F, in a great degree, from the side pressure. F are two connecting-bars, to the ends of which are pivoted the ends of the bars D, as shown in figs. 1 and 2, so as to hold the segmental cogs always in gear with each other, at whatever angle the shafts may meet.

By these improvements the coupling may be made smaller, requiring less material, and being more easily made, while, at the same time, it works true and perfectly easy in every position.

I claim as new, and desire to secure by Letters Patent—

1. Forming the bars D, upon which the segmental cogs E are cast solid, substantially as herein shown and described, and for the purpose set forth.

2. Forming rims or flanges upon the sides of the segmental cogs E, for the purpose of preventing their lateral movement, and relieving the side pressure upon the connecting-bars F, as herein shown and described.

JOHN M. CASE.

Witnesses:
GEORGE TAYLOR,
CHARLES DANIEL.